US008275197B2

(12) United States Patent
Hawkins et al.

(10) Patent No.: US 8,275,197 B2
(45) Date of Patent: Sep. 25, 2012

(54) TECHNIQUES TO MANAGE A WHITEBOARD FOR MULTIMEDIA CONFERENCE EVENTS

(75) Inventors: Quinn Hawkins, Kirkland, WA (US); Pulin Thakkar, Redmond, WA (US); Kapil Sharma, Woodinville, WA (US); Avronil Bhattacharjee, Redmond, WA (US); Adam Eversole, Redmond, WA (US); Bo Qin, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1136 days.

(21) Appl. No.: 12/139,454

(22) Filed: Jun. 14, 2008

(65) Prior Publication Data

US 2009/0309956 A1 Dec. 17, 2009

(51) Int. Cl.
*G06K 9/00* (2006.01)

(52) U.S. Cl. ........................................ 382/165

(58) Field of Classification Search .......... 382/162–166, 382/181, 187, 190, 200–203, 282–283, 173, 382/176; 348/14.08–14.1; 345/619, 441, 345/589
See application file for complete search history.

(56) References Cited

U.S. PATENT DOCUMENTS

| 5,638,190 | A | * | 6/1997 | Geist | 358/500 |
|---|---|---|---|---|---|
| 6,144,991 | A | | 11/2000 | England | |
| 6,388,654 | B1 | | 5/2002 | Platzker et al. | |
| 6,937,266 | B2 | | 8/2005 | Rui et al. | |
| 6,999,622 | B2 | * | 2/2006 | Komatsu | 382/202 |
| 7,171,056 | B2 | | 1/2007 | Zhang et al. | |
| 7,177,483 | B2 | * | 2/2007 | Saund | 382/282 |
| 7,219,233 | B1 | | 5/2007 | Hendriks et al. | |
| 7,260,257 | B2 | * | 8/2007 | Zhang et al. | 382/165 |
| 7,260,278 | B2 | | 8/2007 | Zhang et al. | |
| 7,426,297 | B2 | * | 9/2008 | Zhang et al. | 382/165 |
| 7,576,753 | B2 | * | 8/2009 | Saund et al. | 345/619 |
| 2004/0042680 | A1 | | 3/2004 | Saund | |
| 2004/0263636 | A1 | | 12/2004 | Cutler et al. | |
| 2005/0180631 | A1 | | 8/2005 | Zhang et al. | |
| 2005/0244065 | A1 | | 11/2005 | Malvar et al. | |
| 2007/0222747 | A1 | | 9/2007 | Kritt et al. | |
| 2010/0074546 | A1 | * | 3/2010 | Ishigami et al. | 382/251 |

OTHER PUBLICATIONS

"eBeam Whiteboard with Bluetooth Wireless Technology", http://www.e-beam.com/products/whiteboard.html.
Sundholm, et al. "Learning Conceptual Design: Collaborative Activities with Electronic Whiteboards", In CADE2004 Web Proceedings of Computers in Art and Design Education Conference, Denmark and Malmö University, Sweden, Jun. 29-Jul. 1, 2004, pp. 1-9. Zhang, "Computer Vision Technologies for Remote Collaboration Using Physical Whiteboards, Projectors and Cameras", Proceedings of the Computer Vision for Interactive and Intelligent Environment, Date: 2005, pp. 109-122, IEEE Computer Society, Washington, DC, USA.
Li-Wei He et al. "Real-Time Whiteboard Capture and Processing Using a Video Camera for Teleconferencing" In: Microsoft Research, One Microsoft Way, Redmond, WA, USA, Microsoft Research Technical Report: MSR-TTR-2004-91.
International Search Report for PCT/US2009/045119, mailed Jan. 20, 2010, 2 pages.

* cited by examiner

*Primary Examiner* — Ishrat I Sherali

(57) ABSTRACT

Techniques to manage a whiteboard for multimedia conference events are described. An apparatus may comprise a whiteboard manager component operative to manage whiteboard recording, image processing and reproduction operations for a multimedia conference event. The whiteboard manager component may comprise an image quantizer module operative to receive an image of a writing surface with pen strokes, and quantize each pixel of the image into a predetermined number of colors, an attribute extractor module communicatively coupled to the image quantizer module, the attribute extractor module operative to extract stroke attribute information for the pen strokes from the quantized pixels, and a whiteboard interface module communicatively coupled to the attribute extractor module, the whiteboard interface module operative to send the stroke attribute information to a meeting console for rendering as digital pen strokes on a digital writing surface. Other embodiments are described and claimed.

19 Claims, 6 Drawing Sheets

*400*

RECEIVE AN IMAGE OF A WRITING SURFACE WITH PEN STROKES
*402*

QUANTIZE EACH PIXEL OF THE IMAGE INTO A PREDETERMINED NUMBER OF COLORS
*404*

EXTRACT STROKE ATTRIBUTE INFORMATION FOR THE PEN STROKES FROM THE QUANTIZED PIXELS
*406*

SEND THE STROKE ATTRIBUTE INFORMATION TO A MEETING CONSOLE FOR RENDERING AS DIGITAL PEN STROKES ON A DIGITAL WRITING SURFACE
*408*

*FIG. 4*

TECHNIQUES TO MANAGE A WHITEBOARD FOR MULTIMEDIA CONFERENCE EVENTS

RELATED APPLICATION

The present application is related to commonly-owned U.S. patent application Ser. No. 11/689,171 titled "System and Method For Real-Time Whiteboard Capture and Processing" filed on Mar. 21, 2007 and published as USPA Publication 2007/0156816 A1, which is hereby incorporated by reference in its entirety.

BACKGROUND

A multimedia conference system typically allows multiple participants to communicate and share different types of media content in a collaborative and real-time meeting over a network. The multimedia conference system may display different types of media content using various graphical user interface (GUI) windows or views. For example, one GUI view might include video images of participants, another GUI view might include presentation slides, yet another GUI view might include text messages between participants, and so forth. In this manner various geographically disparate participants may interact and communicate information in a virtual meeting environment similar to a physical meeting environment where all the participants are within one room.

In some cases, a number of participants for a multimedia conference may gather in a conference room. To facilitate collaboration, a whiteboard or other writing surface may be used for notes, diagrams, and other non-permanent markings. Due to constraints on input devices such as video cameras, however, it may be difficult for remote viewers to view the whiteboard and any writings thereon. One common solution is to utilize an electronic or interactive whiteboard designed to convert markings made on the writing surface to digital information. An interactive whiteboard, however, may be expensive due to the hardware and software requirements for the interactive whiteboard, and potentially increases complexity for a user due to the associated configuration operations needed to setup and operate the interactive whiteboard. Another alternative is to use a specially designed pen for the whiteboard, although it has the same type of limitations. It is with respect to these considerations and others that the present improvements have been made.

SUMMARY

Various embodiments may be generally directed to multimedia conference systems. Some embodiments may be particularly directed to techniques to manage recordings for a multimedia conference event. The multimedia conference event may include multiple participants, some of which may gather in a conference room, while others may participate in the multimedia conference event from a remote location.

In one embodiment, an apparatus may comprise a whiteboard manager component operative to manage whiteboard recording, image processing and reproduction operations for a multimedia conference event. The whiteboard manager component may comprise, among other elements, an image quantizer module operative to receive an image of a writing surface with pen strokes, and quantize each pixel of the image into a predetermined number of colors. The whiteboard manager component may further comprise an attribute extractor module communicatively coupled to the image quantizer module, where the extractor module is operative to extract stroke attribute information for the pen strokes from the quantized pixels. The whiteboard manager component may still further comprise a whiteboard interface module communicatively coupled to the attribute extractor module, where the whiteboard interface module is operative to send the stroke attribute information to a meeting console for rendering as digital pen strokes on a digital writing surface. Other embodiments are described and claimed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 illustrates an embodiment of a logic flow.

DETAILED DESCRIPTION

Figure 1:
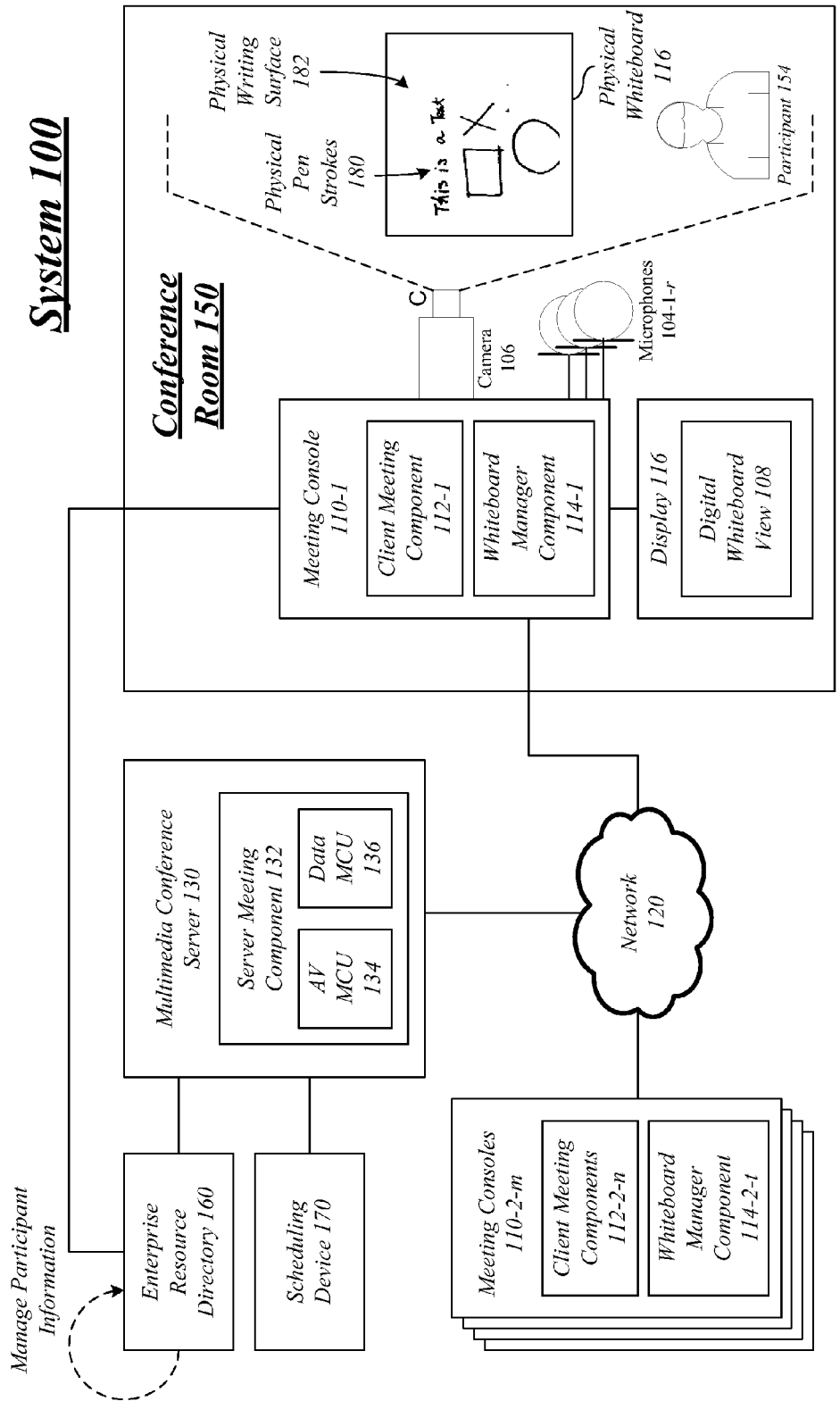
FIG. 1 illustrates an embodiment of a multimedia conference system.

Various embodiments include physical or logical structures arranged to perform certain operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments may be generally directed to multimedia conference systems arranged to provide meeting and collaboration services to multiple participants over a network. Some multimedia conference systems may be designed to operate with various packet-based networks, such as the Internet or World Wide Web ("web"), to provide web-based conferencing services. Such implementations are sometimes referred to as web conferencing systems. An example of a web conferencing system may include MICROSOFT® OFFICE LIVE MEETING made by Microsoft Corporation, Redmond, Wash. Other multimedia conference systems may be designed to operate for a private network, business, organization, or enterprise, and may utilize a multimedia conference server such as MICROSOFT OFFICE COMMUNICATIONS SERVER made by Microsoft Corporation, Redmond, Wash. It may be appreciated, however, that implementations are not limited to these examples.

A multimedia conference system may include, among other network elements, a multimedia conference server or other processing device arranged to provide web conferencing services. For example, a multimedia conference server may include, among other server elements, a server meeting component operative to control and mix different types of media content for a meeting and collaboration event, such as a web conference. A meeting and collaboration event may refer to any multimedia conference event offering various types of multimedia information in a real-time or live online environment, and is sometimes referred to herein as simply a "meeting event," "multimedia event" or "multimedia conference event."

In one embodiment, the multimedia conference system may further include one or more computing devices implemented as meeting consoles. Each meeting console may be arranged to participate in a multimedia event by connecting to the multimedia conference server. Different types of media information from the various meeting consoles may be received by the multimedia conference server during the multimedia event, which in turn distributes the media information to some or all of the other meeting consoles participating in the multimedia event As such, any given meeting console may have a display with multiple media content views of different types of media content. In this manner various geographically disparate participants may interact and communicate information in a virtual meeting environment similar to a physical meeting environment where all the participants are within one room.

To facilitate collaboration for a multimedia conference event, a whiteboard or other writing surface may be used for notes, diagrams, and other non-permanent markings. Due to constraints on input devices such as video cameras, however, it may be difficult for remote viewers to view the whiteboard and any writings thereon. Conventional solutions such as interactive whiteboards and/or electronic pens may be expensive due to the corresponding hardware and software requirements, and potentially increases complexity for a user due to the associated configuration operations needed to setup and operate such devices.

An alternative solution to instrumenting the pens or whiteboard is through the use of a video camera to capture and filter images of a whiteboard and any markings made thereon. For example, a Real-Time Whiteboard Capture System (RTWCS) utilizes a technique which captures pen strokes on whiteboards in real time using a video camera. No modifications are needed for the pens or whiteboard. The RTWCS analyzes the sequence of captured video images in real time, classifies the pixels into whiteboard background, pen strokes and foreground objects (e.g., people in front of the whiteboard), and extracts newly written pen strokes. The images are then processed to enhance clarity and sent to a remote device for display to remote viewers. Although providing several advantages, an RTWCS system communicates media content in the form of images of the whiteboard, and therefore potentially consumes scarce communication bandwidth resources.

To solve these and other problems, embodiments may implement various enhanced whiteboard management techniques. Some embodiments may utilize an RTWCS to capture whiteboard images in real time. The embodiments may then implement a vectorization technique to analyze the images to identify and extract relevant attribute information about the whiteboard and the pen strokes made on the whiteboard. The attribute information is then communicated to a remote device, which renders the relevant attribute information into digital representations of the whiteboard and the pen strokes on the whiteboard. The attribute information consumes lower communications bandwidth than sending images, and therefore results in a lower cost system. Furthermore, the digital representation of the whiteboard and pen strokes on the whiteboard allows a remote user to manipulate and edit the digital representations. This may allow interactive whiteboard sessions between a remote user viewing the digital representations and a local user actually writing on the physical whiteboard. This may also be advantageous to preserve comments by remote viewers when recording a multimedia conference event for later viewing. In this manner, a lower cost whiteboard solution may be implemented for a multimedia conference event.

FIG. 1 illustrates a block diagram for a multimedia conference system 100. Multimedia conference system 100 may represent a general system architecture suitable for implementing various embodiments. Multimedia conference system 100 may comprise multiple elements. An element may comprise any physical or logical structure arranged to perform certain operations. Each element may be implemented as hardware, software, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. Although multimedia conference system 100 as shown in FIG. 1 has a limited number of elements in a certain topology, it may be appreciated that multimedia conference system 100 may include more or less elements in alternate topologies as desired for a given implementation. The embodiments are not limited in this context.

In various embodiments, the multimedia conference system 100 may comprise, or form part of, a wired communications system, a wireless communications system, or a combination of both. For example, the multimedia conference system 100 may include one or more elements arranged to communicate information over one or more types of wired communications links. Examples of a wired communications link may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The multimedia conference system 100 also may include one or more elements arranged to communicate information over one or more types of wireless communications links. Examples of a wireless communications link may include, without limitation, a radio channel, infrared channel, radio-frequency (RF) channel, Wireless Fidelity (WiFi) channel, a portion of the RF spectrum, and/or one or more licensed or license-free frequency bands.

In various embodiments, the multimedia conference system 100 may be arranged to communicate, manage or process different types of information, such as media information and control information. Examples of media information may generally include any data representing content meant for a user, such as voice information, video information, audio information, image information, textual information, numerical information, application information, alphanumeric symbols, graphics, and so forth. Media information may sometimes be referred to as "media content" as well. Control information may refer to any data representing commands, instructions or control words meant for an automated system. For example, control information may be used to route media information through a system, to establish a connection between devices, instruct a device to process the media information in a predetermined manner, and so forth.

In various embodiments, multimedia conference system 100 may include a multimedia conference server 130. The multimedia conference server 130 may comprise any logical or physical entity that is arranged to establish, manage or control a multimedia conference call between meeting consoles 110-1-m over a network 120. Network 120 may comprise, for example, a packet-switched network, a circuit-switched network, or a combination of both. In various embodiments, the multimedia conference server 130 may comprise or be implemented as any processing or computing device, such as a computer, a server, a server array or server farm, a work station, a mini-computer, a main frame computer, a supercomputer, and so forth. The multimedia conference server 130 may comprise or implement a general or specific computing architecture suitable for communicating and processing multimedia information. In one embodiment, for example, the multimedia conference server 130 may be implemented using a computing architecture as described with reference to FIG. 5. Examples for the multimedia conference server 130 may include without limitation a MICROSOFT OFFICE COMMUNICATIONS SERVER, a MICROSOFT OFFICE LIVE MEETING server, and so forth.

A specific implementation for the multimedia conference server 130 may vary depending upon a set of communication protocols or standards to be used for the multimedia conference server 130. In one example, the multimedia conference server 130 may be implemented in accordance with the Internet Engineering Task Force (IETF) Multiparty Multimedia Session Control (MMUSIC) Working Group Session Initiation Protocol (SIP) series of standards and/or variants. SIP is a proposed standard for initiating, modifying, and terminating an interactive user session that involves multimedia elements such as video, voice, instant messaging, online games, and virtual reality. In another example, the multimedia conference server 130 may be implemented in accordance with the International Telecommunication Union (ITU) H.323 series of standards and/or variants. The H.323 standard defines a multipoint control unit (MCU) to coordinate conference call operations. In particular, the MCU includes a multipoint controller (MC) that handles H.245 signaling, and one or more multipoint processors (MP) to mix and process the data streams. Both the SIP and H.323 standards are essentially signaling protocols for Voice over Internet Protocol (VoIP) or Voice Over Packet (VOP) multimedia conference call operations. It may be appreciated that other signaling protocols may be implemented for the multimedia conference server 130, however, and still fall within the scope of the embodiments.

Regardless of the specific communications protocols and standards used for a given implementation, the multimedia conference server 130 typically includes two types of MCUs. The first MCU is an AV MCU 134 used to process and distribute AV signals among the meeting consoles 110-1-m. For example, the AV MCU 134 may process and distribute video images and sound from the participants 154-1-p involved in the multimedia conference event. The second MCU is a data MCU 136 used to process and distribute data signals among the meeting consoles 110-1-m. For example, the data MCU 136 may process and distribute application data such as a slide deck for a presentation application program, as well as attribute information for a whiteboard as described in more detail below.

In general operation, multimedia conference system 100 may be used for multimedia conference calls. Multimedia conference calls typically involve communicating voice, video, and/or data information between multiple end points. For example, a public or private packet network 120 may be used for audio conferencing calls, video conferencing calls, audio/video conferencing calls, collaborative document sharing and editing, and so forth. The packet network 120 may also be connected to a Public Switched Telephone Network (PSTN) via one or more suitable VoIP gateways arranged to convert between circuit-switched information and packet information.

To establish a multimedia conference call over the packet network 120, each meeting console 110-1-m may connect to multimedia conference server 130 via the packet network 120 using various types of wired or wireless communications links operating at varying connection speeds or bandwidths, such as a lower bandwidth PSTN telephone connection, a medium bandwidth DSL modem connection or cable modem connection, and a higher bandwidth intranet connection over a local area network (LAN), for example.

In various embodiments, the multimedia conference server 130 may establish, manage and control a multimedia conference call between meeting consoles 110-1-m. In some embodiments, the multimedia conference call may comprise a live web-based conference call using a web conferencing application that provides full collaboration capabilities. The multimedia conference server 130 operates as a central server that controls and distributes media information in the conference. It receives media information from various meeting consoles 110-1-m, performs mixing operations for the multiple types of media information, and forwards the media information to some or all of the other participants. One or more of the meeting consoles 110-1-m may join a conference by connecting to the multimedia conference server 130. The multimedia conference server 130 may implement various admission control techniques to authenticate and add meeting consoles 110-1-m in a secure and controlled manner.

In various embodiments, the multimedia conference system 100 may include one or more computing devices implemented as meeting consoles 110-1-m to connect to the multimedia conference server 130 over one or more communications connections via the network 120. For example, a computing device may implement a client application that may host multiple meeting consoles each representing a separate conference at the same time. Similarly, the client application may receive multiple audio, video and data streams. For example, video streams from all or a subset of the participants may be displayed as a mosaic on the participant's display with a top window with video for the current active speaker, and a panoramic view of the other participants in other windows.

The meeting consoles 110-1-m may comprise any logical or physical entity that is arranged to participate or engage in a multimedia conference call managed by the multimedia conference server 130. The meeting consoles **110-1-*m* may be implemented as any device that includes, in its most basic form, a processing system including a processor and memory, one or more multimedia input/output (I/O) components, and a wireless and/or wired network connection. Examples of multimedia I/O components may include audio I/O components (e.g., microphones, speakers), video I/O components (e.g., video camera, display), tactile (I/O) components (e.g., vibrators), user data (I/O) components (e.g., keyboard, thumb board, keypad, touch screen), and so forth. Examples of the meeting consoles 110-1-*m* may include a telephone, a VoIP or VOP telephone, a packet telephone designed to operate on the PSTN, an Internet telephone, a video telephone, a cellular telephone, a personal digital assistant (PDA), a combination cellular telephone and PDA, a mobile computing device, a smart phone, a one-way pager, a two-way pager, a messaging device, a computer, a personal computer (PC), a desktop computer, a laptop computer, a notebook computer, a handheld computer, a network appliance, and so forth. In some implementations, the meeting consoles 110-1-*m* may be implemented using a general or specific computing architecture similar to the computing architecture described with reference to FIG. 5**.

The meeting consoles **110-1-*m* may comprise or implement respective client meeting components 112-1-*n*. The client meeting components 112-1-*n* may be designed to interoperate with the server meeting component 132 of the multimedia conference server 130 to establish, manage or control a multimedia conference event. For example, the client meeting components 112-1-*n* may comprise or implement the appropriate application programs and user interface controls to allow the respective meeting consoles 110-1-*m* to participate in a web conference facilitated by the multimedia conference server 130. This may include input equipment (e.g., video camera, microphone, keyboard, mouse, controller, etc.) to capture media information provided by the operator of a meeting console 110-1-*m*, and output equipment (e.g., display, speaker, etc.) to reproduce media information by the operators of other meeting consoles 110-1-*m*. Examples for client meeting components 112-1-*n*** may include without limitation a MICROSOFT OFFICE COMMUNICATOR or the MICROSOFT OFFICE LIVE MEETING Windows Based Meeting Console, and so forth.

As shown in the illustrated embodiment of FIG. 1, the multimedia conference system 100 may include a conference room 150. An enterprise or business typically utilizes conference rooms to hold meetings. Such meetings include multimedia conference events having participants located internal to the conference room 150, and remote participants located external to the conference room 150. The conference room 150 may have various computing and communications resources available to support multimedia conference events, and provide multimedia information between one or more remote meeting consoles **110-2-*m* and the local meeting console 110-1. For example, the conference room 150 may include a local meeting console 110-1 located internal to the conference room 150**.

The local meeting console 110-1 may be connected to various multimedia input devices and/or multimedia output devices capable of capturing, communicating or reproducing multimedia information. The multimedia input devices may comprise any logical or physical device arranged to capture or receive as input multimedia information from operators within the conference room 150, including audio input devices, video input devices, image input devices, text input devices, and other multimedia input equipment. Examples of multimedia input devices may include without limitation video cameras, microphones, microphone arrays, conference telephones, whiteboards, interactive whiteboards, voice-to-text components, text-to-voice components, voice recognition systems, pointing devices, keyboards, touchscreens, tablet computers, handwriting recognition devices, and so forth. An example of a video camera may include a ringcam, such as the MICROSOFT ROUNDTABLE made by Microsoft Corporation, Redmond, Wash. The MICROSOFT ROUNDTABLE is a videoconferencing device with a 360 degree camera that provides remote meeting participants a panoramic video of everyone sitting around a conference table. The multimedia output devices may comprise any logical or physical device arranged to reproduce or display as output multimedia information from operators of the remote meeting consoles **110-2-*m***, including audio output devices, video output devices, image output devices, text input devices, and other multimedia output equipment. Examples of multimedia output devices may include without limitation electronic displays, video projectors, speakers, vibrating units, printers, facsimile machines, and so forth.

The local meeting console 110-1 in the conference room 150 may include various multimedia input devices arranged to capture media content from the conference room 150 including the participants **154-1-*p*, and stream the media content to the multimedia conference server 130. In the illustrated embodiment shown in FIG. 1, the local meeting console 110-1 includes a video camera 106 and an array of microphones 104-1-*e*. The video camera 106 may capture video content including video content of the participants 154-1-*p* present in the conference room 150, and stream the video content to the multimedia conference server 130 via the local meeting console 110-1. Similarly, the array of microphones 104-1-*e* may capture audio content including audio content from the participants 154-1-*p* present in the conference room 150, and stream the audio content to the multimedia conference server 130 via the local meeting console 110-1. The local meeting console may also include various media output devices, such as a display 116 or video projector, to show one or more GUI views with video content or audio content from all the participants using the meeting consoles 110-1-*m* received via the multimedia conference server 130**.

The meeting consoles **110-1-*m* and the multimedia conference server 130 may communicate media information and control information utilizing various media connections established for a given multimedia conference event. The media connections may be established using various VoIP signaling protocols, such as the SIP series of protocols. The SIP series of protocols are application-layer control (signaling) protocol for creating, modifying and terminating sessions with one or more participants. These sessions include Internet multimedia conferences, Internet telephone calls and multimedia distribution. Members in a session can communicate via multicast or via a mesh of unicast relations, or a combination of these. SIP is designed as part of the overall IETF multimedia data and control architecture currently incorporating protocols such as the resource reservation protocol (RSVP) (IEEE RFC 2205) for reserving network resources, the real-time transport protocol (RTP) (IEEE RFC 1889) for transporting real-time data and providing Quality-of-Service (QOS) feedback, the real-time streaming protocol (RTSP) (IEEE RFC 2326) for controlling delivery of streaming media, the session announcement protocol (SAP) for advertising multimedia sessions via multicast, the session description protocol (SDP) (IEEE RFC 2327) for describing multimedia sessions, and others. For example, the meeting consoles 110-1-*m*** may use SIP as a signaling channel to setup the media connections, and RTP as a media channel to transport media information over the media connections.

In general operation, a schedule device 170 may be used to generate a multimedia conference event reservation for the multimedia conference system 100. The scheduling device 170 may comprise, for example, a computing device having the appropriate hardware and software for scheduling multimedia conference events. For example, the scheduling device 170 may comprise a computer utilizing MICROSOFT OFFICE OUTLOOK® application software, made by Microsoft Corporation, Redmond, Wash. The MICROSOFT OFFICE OUTLOOK application software comprises messaging and collaboration client software that may be used to schedule a multimedia conference event. An operator may use MICROSOFT OFFICE OUTLOOK to convert a schedule request to a MICROSOFT OFFICE LIVE MEETING event that is sent to a list of meeting invitees. The schedule request may include a hyperlink to a virtual room for a multimedia conference event. An invitee may click on the hyperlink, and the meeting console 110-1-*m* launches a web browser, connects to the multimedia conference server 130, and joins the virtual room. Once there, the participants can present a slide presentation, annotate documents or brainstorm on the built in whiteboard, among other tools.

An operator may use the scheduling device 170 to generate a multimedia conference event reservation for a multimedia conference event. The multimedia conference event reservation may include a list of meeting invitees for the multimedia conference event. The meeting invitee list may comprise a list of individuals invited to a multimedia conference event. In some cases, the meeting invitee list may only include those individuals invited and accepted for the multimedia event. A client application, such as a mail client for Microsoft Outlook, forwards the reservation request to the multimedia conference server 130. The multimedia conference server 130 may receive the multimedia conference event reservation, and retrieve the list of meeting invitees and associated information for the meeting invitees from a network device, such as an enterprise resource directory 160.

The enterprise resource directory 160 may comprise a network device that publishes a public directory of operators and/or network resources. A common example of network resources published by the enterprise resource directory 160 includes network printers. In one embodiment, for example, the enterprise resource directory 160 may be implemented as a MICROSOFT ACTIVE DIRECTORY®. Active Directory is an implementation of lightweight directory access protocol (LDAP) directory services to provide central authentication and authorization services for network computers. Active Directory also allows administrators to assign policies, deploy software, and apply important updates to an organization. Active Directory stores information and settings in a central database. Active Directory networks can vary from a small installation with a few hundred objects, to a large installation with millions of objects.

In various embodiments, the enterprise resource directory 160 may include identifying information for the various meeting invitees to a multimedia conference event. The identifying information may include any type of information capable of uniquely identifying each of the meeting invitees. For example, the identifying information may include without limitation a name, a location, contact information, account numbers, professional information, organizational information (e.g., a title), personal information, connection information, presence information, a network address, a media access control (MAC) address, an Internet Protocol (IP) address, a telephone number, an email address, a protocol address (e.g., SIP address), equipment identifiers, hardware configurations, software configurations, wired interfaces, wireless interfaces, supported protocols, presence information, and other desired information.

The multimedia conference server 130 may receive the multimedia conference event reservation, including the list of meeting invitees, and retrieves the corresponding identifying information from the enterprise resource directory 160. The multimedia conference server 130 may use the list of meeting invitees and corresponding identifying information to assist in identifying the participants to a multimedia conference event. The multimedia conference server 130 may also store and use the identifying information for implementing various recording management techniques.

Once a multimedia conference event is initiated, the one or more meeting consoles 110-1-*m* may receive media content such as audio/visual (A/V) data from any local media source (e.g., a camera and/or microphone) and can send this media content over the network 120. In one embodiment, there is a distributed object (DO) layer which abstracts signaling stack transactions between the meeting consoles 110-1-*m* and the multimedia conference server 130. Similarly, conference control and media transactions between the meeting consoles 110-1-*m* and the multimedia conference server 130 may be abstracted, as will be known by those skilled in the art. The meeting components 112, 132 may be operative for setting up and executing a web meeting, which includes sending and receiving meeting data, such as video and audio media content. Various user interface (UI) control modules may be implemented by the client meeting components 112-1-*n* at the meeting consoles 110-1-*m* to allow set up, control and display operations of the system and data. The client meeting components 112-1-*n* can also process integrated audio such as VOIP signals and PSTN signals.

The various client meeting components 112-1-*n* may capture and receive media content from any media source, such as a conventional video camera 106 and microphones 104-1-*e*. The client meeting components 112-1-*n* render the media content on the display 116 with integrated or separate speakers. The client meeting components 112-1-*n* also have various input devices such as a keyboard or mouse. The client meeting components 112-1-*n* also have a module for receiving and storing various real-time communication (RTC) and meeting media and data transactions and a signaling stack for communicating with the server meeting component 132 of the multimedia conference server 130. In one embodiment, the meeting components 112, 132 communicate via a SIP protocol and an access proxy which interfaces with the signaling stack at the server meeting component 132. As previously described, SIP is an application-layer control (signaling) protocol for creating, modifying, and terminating sessions with one or more participants. These sessions typically include Internet telephone calls, multimedia distribution, and multimedia conferences. It is widely used as signaling protocol for VoIP, along with H.323 and others. Alternately the communication between the meeting components 112, 132 may take place via a secure standard or proprietary protocol such as the Persistent Shared Object Model (PSOM) protocol, although any other protocol for sharing data could be employed.

During a multimedia conference event, the client meeting components 112-1-*n* may capture and receive media content from the conference room 150 using the video camera 106. In addition to the participants 154-1-*p*, the conference room 150 may include a writing surface such as a physical whiteboard 116. The physical whiteboard 116 provides a large shared space for the participants 154-1-*p* to focus their attention and express their ideas spontaneously. It is not only effective but also economical and easy to use since all that is needed is a flat writing surface and several marking pens, such as dry-ink pens. The participants 154-1-*p* may collaborate by writing and drawing on the physical whiteboard 116. The result is a compilation of physical pen strokes 180 made on the physical writing surface 182. For a remote viewer, however, the images of the physical whiteboard 116 may be difficult to view for a number of different reasons, such as the viewing angle of the physical whiteboard 116, glare from overhead lights, small size of the physical pen strokes 180, resolution constraints for the video camera 106, and so forth. This reduces the effectiveness of the physical whiteboard 116 as a collaboration tool for the remote viewers.

To solve these and other problems, the meeting consoles 110-1-*m* may include a whiteboard manager component 114-1-*t*. The whiteboard manager component 114-1-*t* may implement various enhanced whiteboard management techniques directed to improving use of the physical whiteboard 116 as a collaboration tool during a multimedia conference event. The whiteboard manager component 114-1-*t* is generally arranged to manage whiteboard recording, image processing and reproduction operations for a multimedia conference event.

In one embodiment, for example, the whiteboard manager component 114-1-*t* may implement a RTWCS architecture similar to the one described in USPA Publication 2007/0156816 A1. For example, the RTWCS architecture receives a sequence of video images from the video camera 106, and analyzes the image sequence in order to separate the background image of the physical whiteboard 116 from the foreground image of a participant 154-1-*p* writing on the physical whiteboard 116. The RTWCS also analysis the image sequence to extract the background images for any new physical pen strokes 180 as they appear on the physical writing surface 182. The RTWCS then enhances the background images of the physical whiteboard 116, and sends the enhanced images over the network 120 to the multimedia conference server 130 for distribution to the meeting consoles 110-1-*m* participating in a given multimedia conference event.

As an addition or alternative to communicating actual video images of the physical whiteboard 116 over the network 120, the whiteboard manager component 114-1-*t* utilizes various vectorization techniques to extract, process and communicate attribute information derived from the video images of the physical whiteboard 116. The attribute information may be used to render a digital representation of the physical pen strokes 180 on the physical writing surface 182 for display by a digital whiteboard view 108. Sending attribute information for the physical whiteboard 116 rather than actual video images consumes less communications bandwidth relative to the actual video images. Further, the digital whiteboard view 108 is fully editable by viewers using various editing tools implemented by the whiteboard manager component 114-1-*t*, or made available to the whiteboard manager component 114-1-*t* from the native editing tools implemented by the client meeting components 112-1-*n* or OS of the meeting consoles 110-1-*m*. The RTWCS and vectorization aspects of the whiteboard manager component 114-1-*t* may be described in more detail with reference to FIG. 2.

Figure 2:
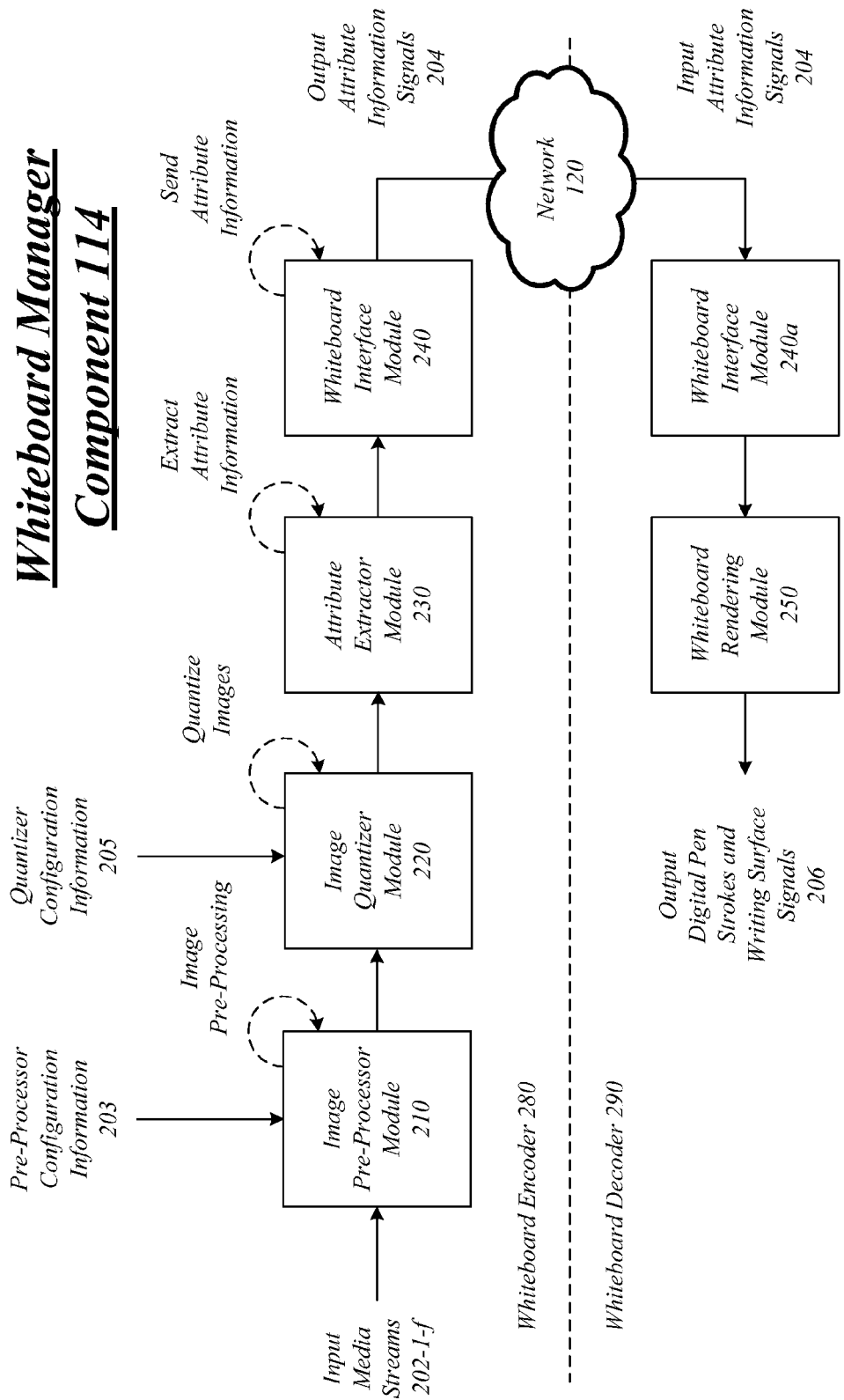
FIG. 2 illustrates an embodiment of a whiteboard manager component.

FIG. 2 illustrates a block diagram for the whiteboard manager component 114, which is representative of the whiteboard manager components 114-1-*t*. The whiteboard manager component 114 may comprise multiple modules. The modules may be implemented using hardware elements, software elements, or a combination of hardware elements and software elements. Although the whiteboard manager component 114 as shown in FIG. 2 has a limited number of elements in a certain topology, it may be appreciated that the whiteboard manager component 114 may include more or less elements in alternate topologies as desired for a given implementation. The embodiments are not limited in this context.

Figure 5:
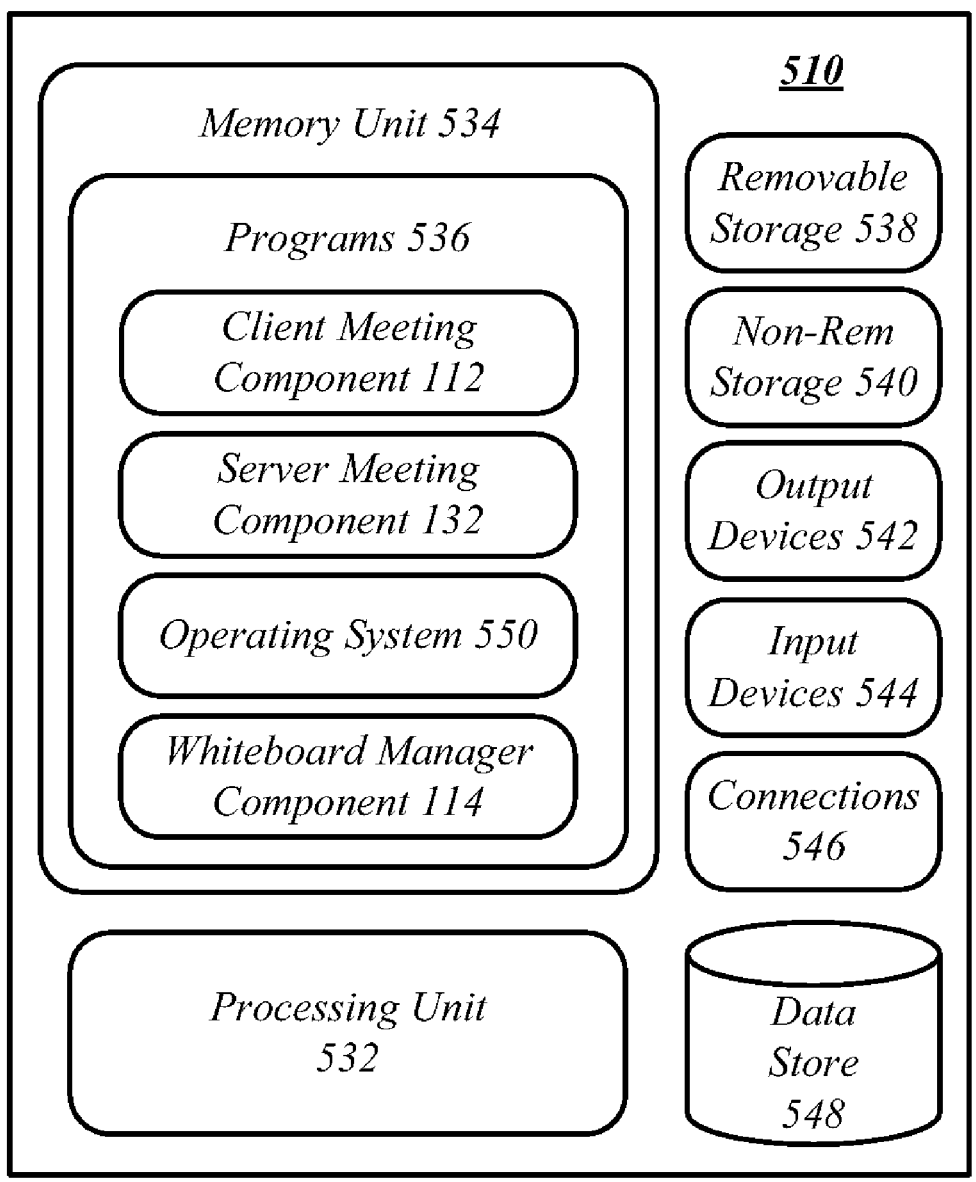
FIG. 5 illustrates an embodiment of a computing architecture.

In the illustrated embodiment shown in FIG. 2, the whiteboard manager component 114 comprises a whiteboard encoder 280 and a whiteboard decoder 290. The whiteboard encoder 280 may comprise, among other elements, an image pre-processor module 210, an image quantizer module 220, an attribute extractor module 230 and a whiteboard interface module 240. The whiteboard decoder 290 may comprise, among other elements, a whiteboard interface module 240*a* and a whiteboard rendering module 250. A memory unit (as shown in FIG. 5) may be used to store such useful information as configuration data, iterative stroke attribute information and surface attribute information, digital whiteboard views, and default surface attribute information.

The whiteboard encoder 280 receives video images of the physical whiteboard 116 recorded by the video camera 106 in the form of one or more input media streams 202-1-*f*. The whiteboard encoder 280 performs image processing using various vectorization techniques on select media content from the input media streams 202-1-*f*. The whiteboard encoder 280 finally outputs various types of attribute information signals 204 derived from one or more of the video images from one or more of the input media streams 202-1-*f*.

The input media streams 202-1-*f* represents raw video data captured by the video camera 106. In one embodiment, the general configuration for the video camera 106 and the physical whiteboard 116 should be as follows:

The resolution should be 1280×960 or larger.
The input format can be RGB24 or Bayer format.
The whiteboard should not be reflecting
The position of whiteboard and camera should be fixed.

During initialization of the RTWCS, the whiteboard manager component 114 may perform certain camera selection and configuration operations. For example, the whiteboard manager component 114 enumerates all installed video cameras and automatically selects one or more of the video cameras (e.g., the video camera 106) for recording the physical whiteboard 116. In some cases, a particular video camera may be previously designated as a video camera for the physical whiteboard 116, in which case the whiteboard manager component 114 selects the pre-designated video camera. Otherwise, the whiteboard manager component 114 searches for a video camera that having the following capabilities: (1) a maximum resolution equal to or larger than 1280×960 resolution; and (2) the exposure mode of the video camera should be controllable by a software development kit (SDK).

Once selected, the whiteboard manager component 114 configures the selected video camera in accordance with the following parameters: (1) set resolution equal or larger than 1280×960; and (2) configure video camera work modes (if possible). If available, the video camera work modes should be set as follows: (1) Auto Focus—turn off and set it to infinity; (2) Auto White Balance—set to auto; (3) Auto Exposure—turn off and set to default value; (4) Auto Gain—turn off and set as low as possible; and (5) Anti—Flicker turn on. The whiteboard manager component 114 may optionally analyze the initial captured frames to determine whether the video camera 106 is facing and centered on the physical whiteboard 116, and if not, automatically calculates the needed adjustments accordingly.

The whiteboard encoder 280 may include the image pre-processor module 210. The image pre-processor module 210 may be generally arranged to receive the input media streams 202-1-$f$ and select one or more video images from the input media streams 202-1-$f$ for image processing. The image pre-processor module 210 may perform various pre-processing operations on the image. For example, the image pre-processor module 210 may implement various common RTWCS techniques, such as calibrating a whiteboard background color to compensate for variations in lighting environments, identifying and removing any foreground objects occluding the physical whiteboard 116 such as a participant 154-1-$p$ drawing on the physical whiteboard 116, removing any shadows made on the physical whiteboard 116 made by the drawing participant 154-1-$p$ or other objects present in the conference room 150, performing white-balancing by making the background (e.g., the physical writing surface 182) uniformly white, performing color enhancing by increasing color saturation of the physical pen strokes 180, and other image pre-processing operations desired to prepare the video images for attribute information processing operations. The pre-processing operations programmed for the image pre-processor module 210 may be defined using the pre-processing configuration information 203.

The whiteboard encoder 280 may include the image quantizer module 220 communicatively coupled to the image pre-processing module 210. The image quantizer module 220 is generally arranged to quantize pixels from the selected video images received from the image pre-processing module 210. In one embodiment, for example, the image quantizer module 220 is operative to quantize each pixel of the image into a predetermined number of colors. In one embodiment, for example, the image quantizer module 220 is arranged to quantize each pixel of a video image into 8 colors, which are defined as 0x000000 (Black), 0xFF0000 (Red), 0x00FF00 (Green), 0x0000FF (Blue), 0xFFFF00, 0xFF00FF, 0x00FFFF and 0xFFFFFF (White). The number of colors is a configurable parameter that may be configured using the quantizer configuration information 205, and may vary according to a given implementation. The embodiments are not limited in this context.

The whiteboard encoder 280 may include the attribute extractor module 230 communicatively coupled to the image quantizer module 220. The attribute extractor module 230 is generally operative to extract attribute information from the video images of the physical whiteboard 116. In one embodiment, for example, the attribute extractor module 230 is operative to receive a video image of the physical writing surface 182 with physical pen strokes 180. The attribute extractor module 230 extracts stroke attribute information representing the physical pen strokes 182 on the physical writing surface 182 from the video image. The attribute extractor module 230 may optionally extract surface attribute information representing the physical writing surface 182 from the video image. The latter case depends in part upon the type of extraction algorithm specifically implemented for the attribute extractor module 230.

The attribute extractor module 230 distinguishes whether a pixel or block of pixels from the video image comprise part of the stroke attribute information or the surface attribute information based on a color for the quantized pixels outputted by the image quantizer module 220. In one embodiment, for example, the attribute extractor module 230 is programmed to determine that quantized white pixels of the video image are part of the surface attribute information. This assumption is based on the fact that the physical whiteboard 116 is typically white in color, although the precise shade of white may vary depending on the make and manufacture of the physical whiteboard 116, and the ambient lighting conditions for the conference room 150. Conversely, the attribute extractor module 230 is programmed to determine that quantized non-white pixels of the video image are part of the stroke attribute information.

The attribute extractor module 230 is further operative to extract the stroke attribute information as comprising various stroke points, stroke colors, and stroke line widths for the physical pen strokes 180. The attribute extractor module 230 makes several passes over the quantized non-white pixels, and begins extraction of the quantized non-white pixels based on color in a predetermined order. For example, the attribute extractor module 230 may begin extracting all quantized black pixels first since most dry-erase markers are black in color. Similarly, the attribute extractor module 230 may process all the quantized red pixels next, then the quantized green pixels, and so forth. Once extracted, the attribute extractor module 230 may recognize a stroke line of a given stroke color, and calculate vectors and stroke points for the stroke lines using the number and location for the extracted quantized pixels.

The attribute extractor module 230 may also calculate varying stroke line widths for the stroke lines of varying stroke colors. This may be accomplished in a number of different ways, including utilizing a "stroke bones" technique and a "constant line widths" technique. The stroke bones technique and the constant line widths technique both have several advantages and disadvantages as described below. Both techniques, however, provide sufficient stroke attribute information to reproduce or reconstruct an editable digital representation for the physical whiteboard 116 captured by the raw video images of the video camera 106. The selection for a particular technique may vary in accordance with the different design constraints and performance parameters for a given implementation.

For the stroke bones technique, the attribute extractor module 230 extracts the stroke attribute information as stroke line widths by segmenting a stroke line into multiple stroke segments with some stroke segments having variable stroke segment widths. To accomplish this, the attribute extractor module 230 extracts strokes using stroke bones for the physical pen strokes 180. The stroke bones may refer to the general length and width of a stroke line that may not necessarily match precisely the handwritten version of the physical pen strokes 180. The attribute extractor module 230 may derive the stroke bones using an image erode algorithm. The attribute extractor module 230 may extract the stroke points, stroke colors, and stroke line widths from the stroke bones.

The stroke bones technique has several advantages. For example, the stroke bones technique describes a stroke line using its stroke points, stroke color and stroke line width. This meets the natural attributes of a handwritten stroke and would make a stroke easier for editing. Further, a natural handwritten stroke typically has different line widths in different segments. The stroke bones technique mimics a natural handwritten stroke by segmenting the physical pen strokes 180 into stroke segments having variable stroke segment widths.

The stroke bones technique also has several disadvantages. For example, the stroke bones technique may result in lower reconstructed quality, particularly for handwritten text, due to the estimation portions of the stroke bones algorithm. Further, a residual background image may be needed as complementary output, thereby potentially necessitating the extraction and communication of surface attribute information for the physical writing surface 182. In addition, the stroke bones technique is computationally expensive, and results in higher processor usage. For example, the processing time needed for processing a 1280×960 image, including color quantization and strokes extraction, is around 380 milliseconds (ms) for a 3.0 Gigahertz (GHz) processor. Adding time needed to retrieve the residual background image, the processing time is approximately 500 to 600 ms. The higher processor usage is caused by the image erode operations and line width checks.

For the constant line widths technique, the attribute extractor module 230 extracts the stroke attribute information as stroke line widths by segmenting a stroke line into multiple stroke segments with some stroke segments having variable stroke segment widths defined by a multiple of a constant stroke line width. To accomplish this, the constant line widths technique extracts strokes directly by describing them with relatively thin lines having a constant line width, such as 1 pixel. In this way, a single thick line is described as several thin lines stacked together.

The constant line widths technique has several advantages. For example, the constant line widths technique results in a higher quality reconstructed image, partially due to the level of granularity provided by the constant stroke line width. In some cases, the reconstructed image is nearly the same as the raw video image. Further, unlike the stroke bones technique, a residual background image is not needed to reconstruct the original image. This allows the RTWCS to reduce or eliminate the need to extract and communicate the surface attribute information for the physical whiteboard 116. This may conserve computational and communication resources. In addition, the constant line widths technique is computationally less expensive than the stroke bones technique. For example, the processing time needed for processing a 1280×960 image, including color quantization and stroke extraction, is approximately 55 ms, as compared to the 500 to 600 ms needed for the stroke bones technique.

The constant line widths technique also has several disadvantages. For example, a physical pen stroke 180 is described using a set of thin lines. This might not match well with the natural attributes of a handwritten stroke. Further, the constant line widths technique may need additional operations to smooth transitions between stroke segments having varying stroke segment widths to remove any blocking or tiling effects.

The whiteboard encoder 280 may include the whiteboard interface module 240 communicatively coupled to the attribute extraction module 230. The whiteboard interface module 240 may be generally operative to provide interface operations for formatting the stroke attribute information and/or surface attribute information into an appropriate format suitable for transport over the network 120. For example, this information may be structured into an Extensible Markup Language (XML) format stream or other suitable format. Once formatted, the whiteboard interface module 240 sends the surface attribute information and/or the stroke attribute information over the network 120 to a remote computing device, such as the meeting consoles 110-1-m, for rendering as digital pen strokes on a digital writing surface.

The whiteboard manager component 114 may include the whiteboard decoder 290. The whiteboard decoder 290 may comprise a whiteboard interface module 240a that is similar to the whiteboard interface module 240. The whiteboard interface module 240a can read the input attribute information signals 204, convert the attribute information signals 204 to a different format (if needed), and forward the attribute information signals 204 to the whiteboard rendering module 250. The whiteboard interface module 240a may optionally be used to generate the digital whiteboard view 108 for the client meeting components 112-1-n.

The whiteboard rendering module 250 may be communicatively coupled to the whiteboard interface module 240a. The whiteboard rendering module 250 may receive the attribute information signals 204, decode the attribute information signals 204, and render the attribute information signals 204 into digital pen strokes and/or the digital writing surface signals 206 suitable for display as the digital whiteboard view 108.

Figure 3:
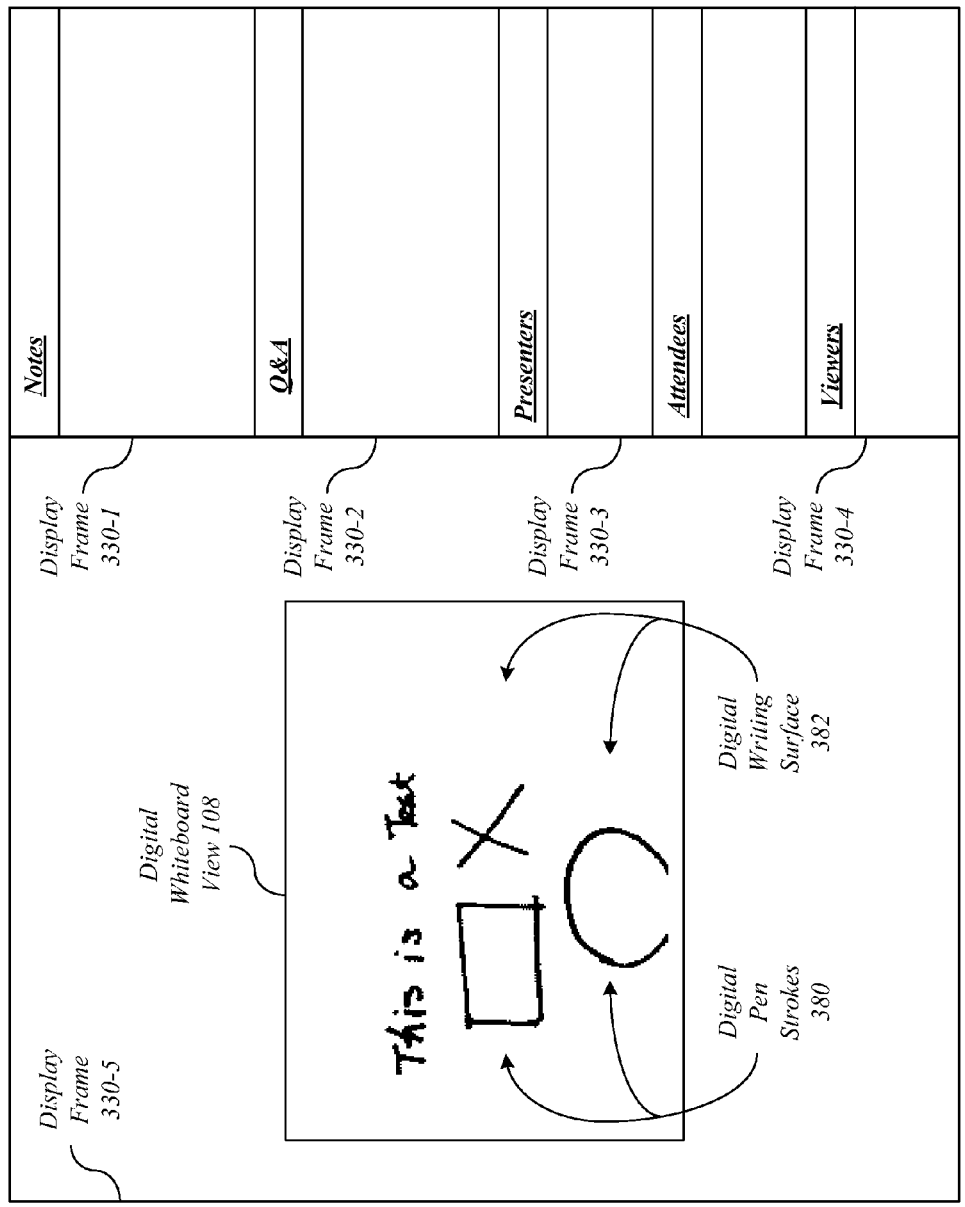
FIG. 3 illustrates an embodiment of a meeting view.

FIG. 3 illustrates a diagram for a meeting view 300. The meeting view 300 may include, among other displayed media content, the digital whiteboard view 108. The meeting view 300 may comprise various display frames 330-1-a arranged in a certain mosaic or display pattern for presentation to a viewer, such as an operator of a meeting console 110-1-m. Each display frame 330-1-a is designed to render or display multimedia content from the media streams 202-1-f such as video content and/or audio content from a corresponding media stream 202-1-f mapped to a given display frame 330-1-a.

In the illustrated embodiment shown in FIG. 3, for example, the meeting view 300 may include a display frame 330-5 comprising a viewing region suitable for displaying the digital whiteboard view 108. Further, the meeting view 300 may include the display frames 330-1 through 330-4 to render or display various types of GUI elements, such as participant contact information and presence information, viewer contact information and presence information, Q&A sessions, notes and so forth. It may be appreciated that the meeting view 300 may include more or less display frames 330-1-a of varying sizes and alternate arrangements as desired for a given implementation.

The digital whiteboard view 108 may include a digital representation of a digital writing surface 382 that generally corresponds to the physical writing surface 182, and digital pen strokes 380 that generally correspond to the physical pen strokes 180. The digital pen strokes 380 may be rendered using the stroke attribute information received from the whiteboard encoder 280. The physical writing surface 182 may be rendered using the surface attribute information also received from the whiteboard encoder 280. In some case, however, the physical writing surface 182 may be rendered as a standard background image stored by the whiteboard manager component 114 or the meeting console 110-1-m. This may be suitable, for example, when the constant line widths technique is used to extract the stroke attribute information, or when adequate computational or communication resources are unavailable. In this case, the surface attribute information is neither extracted by the attribute extractor module 230, thereby saving computational cycles, nor sent by the whiteboard interface module 240, thereby saving communications bandwidth.

The digital whiteboard view 108 may be edited by a viewer using standard editing tools. Edited and unedited versions of the digital whiteboard view 108 may be stored by a data storage system. Further, temporal versions of the digital whiteboard view 108 may be stored at any time during the course of a multimedia conference event. The digital whiteboard view 108 may be stored as part of the general recording for the multimedia conference event, or alternatively, as a separate file from the general recording. An output device such as a printer may be used to produce hard copies of the digital whiteboard view 108.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 4 illustrates one embodiment of a logic flow 400. Logic flow 400 may be representative of some or all of the operations executed by one or more embodiments described herein.

As shown in FIG. 4, the logic flow 400 may receive an image of a writing surface with pen strokes at block 402. For example, the whiteboard encoder 280 of the whiteboard manager component 114-1 may receive a video image of a physical whiteboard 116. The physical whiteboard 116 may comprise a physical writing surface 182 having physical pen strokes 180 written by the participant 154.

The logic flow 400 may quantize each pixel of the image into a predetermined number of colors at block 404. For example, the image quantizer module 220 may quantize each pixel of the image (before or after pre-processing) into 8 colors, which are defined as 0x000000 (Black), 0xFF0000 (Red), 0x00FF00 (Green), 0x0000FF (Blue), 0xFFFF00, 0FF00FF, 0x00FFFF and 0FFFFFF (White). The number of colors is a configurable parameter that may be configured using the quantizer configuration information 205.

The logic flow 400 may extract stroke attribute information for the pen strokes from the quantized pixels at block 406. For example, the attribute extractor module 230 may extract stroke attribute information for the physical pen strokes 180 from the quantized pixels. This may be accomplished, for example, based on colors for the quantized pixels. The attribute extractor module 230 may use a stroke bones technique or a constant line width technique to extract the stroke attribute information. The technique selected will in some part influence whether the attribute extractor module 230 extracts surface attribute information to reconstruct the physical writing surface 182, or utilizes standard background attribute information locally stored by a meeting console to reconstruct the physical writing surface 182.

The logic flow 400 may send the stroke attribute information to a meeting console for rendering as digital pen strokes on a digital writing surface at block 408. For example, the whiteboard interface module 240 may receive the stroke attribute information, convert the stroke attribute information to a suitable transport format (e.g., the XML format), and forward the stroke attribute information to a remote meeting console via the multimedia conference server 130.

FIG. 5 further illustrates a more detailed block diagram of computing architecture 510 suitable for implementing the meeting consoles 110-1-$m$ or the multimedia conference server 130. In a basic configuration, computing architecture 510 typically includes at least one processing unit 532 and memory 534. Memory 534 may be implemented using any machine-readable or computer-readable media capable of storing data, including both volatile and non-volatile memory. For example, memory 534 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. As shown in FIG. 5, memory 534 may store various software programs, such as one or more application programs 536-1-$t$ and accompanying data. Depending on the implementation, examples of application programs 536-1-$t$ may include the client meeting component 112, the server meeting component 132, the whiteboard manager component 114, and so forth.

Computing architecture 510 may also have additional features and/or functionality beyond its basic configuration. For example, computing architecture 510 may include removable storage 538 and non-removable storage 540, which may also comprise various types of machine-readable or computer-readable media as previously described. Computing architecture 510 may also have one or more input devices 544 such as a keyboard, mouse, pen, voice input device, touch input device, measurement devices, sensors, and so forth. Computing architecture 510 may also include one or more output devices 542, such as displays, speakers, printers, and so forth.

Computing architecture 510 may further include one or more communications connections 546 that allow computing architecture 510 to communicate with other devices. Communications connections 546 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

Figure 6:
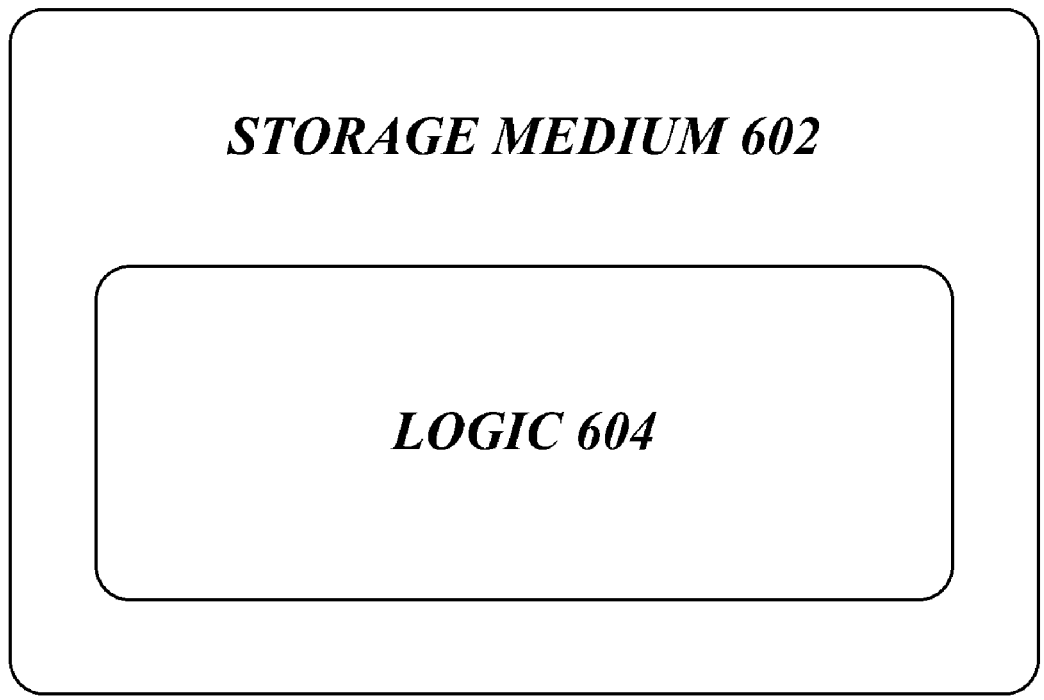
FIG. 6 illustrates an embodiment of an article.

FIG. 6 illustrates a diagram an article of manufacture 600 suitable for storing logic for the various embodiments, including the logic flow 400. As shown, the article of manufacture 600 may comprise a storage medium 602 to store logic 604. Examples of the storage medium 602 may include one or more types of computer-readable storage media capable of storing electronic data, including volatile memory or non-volatile memory, removable or non-removable memory, erasable or non-erasable memory, writeable or re-writeable memory, and so forth. Examples of the logic 604 may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In one embodiment, for example, the article of manufacture 600 and/or the computer-readable storage medium 602 may store logic 604 comprising executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An article comprising a computer-readable storage medium containing instructions that if executed enable a system to:
   receive an image of a writing surface with pen strokes;
   quantize each pixel of the image into a predetermined number of colors;
   extract stroke attribute information for the pen strokes from the quantized pixels; and
   send the stroke attribute information to a meeting console for rendering as digital pen strokes on a digital writing surface.

2. The article of claim 1, further comprising instructions that if executed enable the system to extract surface attribute information for the pen strokes from the quantized pixels, and send the surface attribute information for the writing surface to the meeting console for rendering as the digital writing surface.

3. The article of claim 1, further comprising instructions that if executed enable the system to determine quantized white pixels of the image are part of the surface attribute information, and quantized non-white pixels of the image are part of the stroke attribute information.

4. The article of claim 1, further comprising instructions that if executed enable the system to extract the stroke attribute information as stroke points, stroke colors, and stroke line widths for the pen strokes.

5. The article of claim 1, further comprising instructions that if executed enable the system to render the digital pen strokes on the digital writing surface using the stroke attribute information.

6. A method, comprising:
   receiving an image of a writing surface with pen strokes;
   quantizing each pixel of the image into a predetermined number of colors;
   extracting surface attribute information for the writing surface from the quantized pixels;
   extracting stroke attribute information for the pen strokes from the quantized pixels; and
   sending the surface attribute information and the stroke attribute information to a remote computing device for rendering as digital pen strokes on a digital writing surface.

7. The method of claim 6, comprising determining quantized white pixels of the image are part of the surface attribute information.

8. The method of claim 6, comprising determining quantized non-white pixels of the image are part of the stroke attribute information.

9. The method of claim 6, comprising extracting the stroke attribute information as stroke points, stroke colors, and stroke line widths for the pen strokes.

10. The method of claim 6, comprising extracting the stroke attribute information as stroke line widths by segmenting a stroke line into multiple stroke segments with some stroke segments having variable stroke segment widths.

11. The method of claim 6, comprising extracting the stroke attribute information as stroke line widths by segmenting a stroke line into multiple stroke segments with some stroke segments having variable stroke segment widths defined by a multiple of a constant stroke line width.

12. The method of claim 6, comprising receiving the surface attribute information and stroke attribute information by the remote device.

13. The method of claim 6, comprising rendering the digital writing surface using the surface attribute information and digital pen strokes on the digital writing surface using the stroke attribute information.

14. An apparatus, comprising:
a processor; and
a memory communicatively coupled to the processor, the memory to store a whiteboard manager component operative on the processor to manage whiteboard recording and reproduction operations for a multimedia conference event, the whiteboard manager component comprising:
an image quantizer module operative to receive an image of a writing surface with pen strokes, and quantize each pixel of the image into a predetermined number of colors;
an attribute extractor module communicatively coupled to the image quantizer module, the attribute extractor module operative to extract stroke attribute information for the pen strokes from the quantized pixels; and
a whiteboard interface module communicatively coupled to the attribute extractor module, the whiteboard interface module operative to send the stroke attribute information to a meeting console for rendering as digital pen strokes on a digital writing surface.

15. The apparatus of claim 14, the attribute extractor module operative to extract surface attribute information for the writing surface from the image, and the whiteboard interface module operative to send the surface attribute information to the remote computing device to render the digital writing surface.

16. The apparatus of claim 14, the attribute extractor module operative to extract the stroke attribute information as stroke points, stroke colors, and stroke line widths for the pen strokes.

17. The apparatus of claim 14, the attribute extractor module operative to determine quantized white pixels of the image are part of the surface attribute information, and quantized non-white pixels of the image are part of the stroke attribute information.

18. The apparatus of claim 14, the attribute extractor module operative to extract the stroke attribute information as stroke line widths by segmenting a stroke line into multiple stroke segments with some stroke segments having variable stroke segment widths.

19. The apparatus of claim 14, the attribute extractor module operative to extract the stroke attribute information as stroke line widths by segmenting a stroke line into multiple stroke segments with some stroke segments having variable stroke segment widths defined by a multiple of a constant stroke line width.

* * * * *